(12) United States Patent
Enjolras

(10) Patent No.: US 8,818,669 B2
(45) Date of Patent: Aug. 26, 2014

(54) MOTOR VEHICLE REGENERATIVE BRAKING METHOD

(75) Inventor: Gilles Enjolras, Elancourt (FR)

(73) Assignee: Renault S.A.S., Boulogne-Billancourt (FR)

( * ) Notice: Subject to any disclaimer, the term of this patent is extended or adjusted under 35 U.S.C. 154(b) by 150 days.

(21) Appl. No.: 13/055,022

(22) PCT Filed: Jul. 20, 2009

(86) PCT No.: PCT/FR2009/051447
§ 371 (c)(1), (2), (4) Date: Feb. 24, 2011

(87) PCT Pub. No.: WO2010/010283
PCT Pub. Date: Jan. 28, 2010

(65) Prior Publication Data
US 2011/0144880 A1    Jun. 16, 2011

(30) Foreign Application Priority Data

Jul. 22, 2008 (FR) .................................. 08 04146
Jul. 22, 2008 (FR) .................................. 08 04147

(51) Int. Cl.
*G06F 7/70* (2006.01)

(52) U.S. Cl.
USPC .............. 701/70; 303/152; 318/362; 180/446

(58) Field of Classification Search
USPC ............. 701/70; 303/152; 318/362, 375, 376, 318/803; 180/446
See application file for complete search history.

(56) References Cited

U.S. PATENT DOCUMENTS

| | | | | |
|---|---|---|---|---|
| 6,013,992 A * | 1/2000 | Ishikawa et al. | ............... | 318/376 |
| 7,136,737 B2 * | 11/2006 | Ashizawa et al. | ............... | 701/70 |
| 7,567,042 B2 * | 7/2009 | Kang et al. | .................... | 318/362 |
| 7,798,267 B2 * | 9/2010 | Winkler | .................... | 180/65.285 |
| 8,135,526 B2 * | 3/2012 | Minarcin et al. | ................ | 701/70 |
| 2004/0122579 A1 | 6/2004 | Ashizawa et al. | | |
| 2008/0042489 A1 * | 2/2008 | Lewis et al. | .................... | 303/152 |
| 2008/0122409 A1 | 5/2008 | Winkler | | |
| 2008/0129110 A1 * | 6/2008 | Jager et al. | .................... | 303/152 |
| 2009/0222156 A1 * | 9/2009 | Krueger et al. | ................. | 701/22 |

FOREIGN PATENT DOCUMENTS

| | | |
|---|---|---|
| DE | 699 18 342 | 7/2005 |
| DE | 10 2004 05153 | 5/2006 |
| FR | 2749229 | 12/1997 |
| WO | 2006 076999 | 7/2006 |

OTHER PUBLICATIONS

International Search Report issued Mar. 26, 2010 in PCT/FR09/51447 filed Jul. 20, 2009.

* cited by examiner

*Primary Examiner* — Helal A Algahaim
*Assistant Examiner* — Shardul Patel
(74) *Attorney, Agent, or Firm* — Oblon, Spivak, McClelland, Maier & Neustadt, L.L.P.

(57) ABSTRACT

A regenerative braking method for a motor vehicle, in which the regenerative braking action is applied progressively, a rate of application of the braking action being dependent on a speed of the motor vehicle.

10 Claims, 5 Drawing Sheets

MOTOR VEHICLE REGENERATIVE BRAKING METHOD

BACKGROUND

The present invention relates to a regenerative braking method for a motor vehicle or an energy regeneration braking method for a motor vehicle. It also relates to a data medium comprising software means for implementing such a method, a regenerative braking system intended for a motor vehicle and a vehicle including such a regenerative braking system. The invention also relates to a method of operation of a regenerative braking system that makes it possible to implement the regenerative braking method according to the invention.

It is known to equip motor vehicles, in particular electric or hybrid motor vehicles, with two braking systems: a first dissipative braking system and a second regenerative braking system.

The dissipative braking system converts the kinetic energy of the motor vehicle into a dissipated energy, for example in the form of heat at the brake disk and/or drum level.

The regenerative braking system converts the kinetic energy of the motor vehicle into an energy, for example electrical or mechanical, which can be stored in the vehicle then reused subsequently, notably to accelerate the vehicle.

Managing the use of these two braking systems is complex.

It is in fact difficult to provide two members dedicated to controlling the dissipative braking system and controlling the regenerative braking system respectively.

Therefore, it is commonplace to provide only one control member dedicated to just the dissipative braking system in order to retain a use that is intuitive for the driver of the vehicle. Consequently, it is known to control the regenerative braking system by virtue of an acceleration pedal of the vehicle. In particular, it is known to activate the regenerative braking system when the driver releases the accelerator pedal of the vehicle.

In order to improve the drive comfort of a vehicle comprising the two braking systems described hereinabove and the relevance of the braking action exerted by the regenerative braking system, it is also known, from document FR 2 749 229, to control the braking force produced by the regenerative braking system according to the speed with which the foot is lifted from the accelerator pedal.

However, in deceleration and/or braking phases, the drive comfort of the vehicles discussed previously is not optimal. Similarly, the intensity of the braking action due to the regenerative braking system is not always optimal.

Document DE 699 18 342 discloses a hybrid vehicle that has a regenerative braking system that makes it possible to store energy in the deceleration and braking phases of the vehicle, the regenerated energy being greater in the braking phases.

Document US 2004/0122579 discloses a braking system comprising a regenerative braking device which is activated and deactivated.

Document DE 10 2004 051530 discloses an electrically propelled vehicle that has a regenerative braking system. The intensity of the regenerative braking varies according to the speed of the vehicle.

Document WO 2006/076999 discloses a method of controlling a braking system comprising a regenerative braking device. The intensity of the braking action depends on the speed of the vehicle.

BRIEF SUMMARY

The aim of the present invention is to provide a regenerative braking method that obviates the previously identified drawbacks and makes it possible to improve the regenerative braking methods known from the prior art. In particular, the invention proposes a braking method that enhances the use of the regenerative braking both in terms of regenerated energy level and in terms of feeling and comfort for the occupants of the vehicle.

BRIEF DESCRIPTION OF THE DRAWINGS

The appended drawing represents, by way of examples, modes of execution of a regenerative braking method according to the invention and an embodiment of a braking system according to the invention.

DETAILED DESCRIPTION

Figure 1:
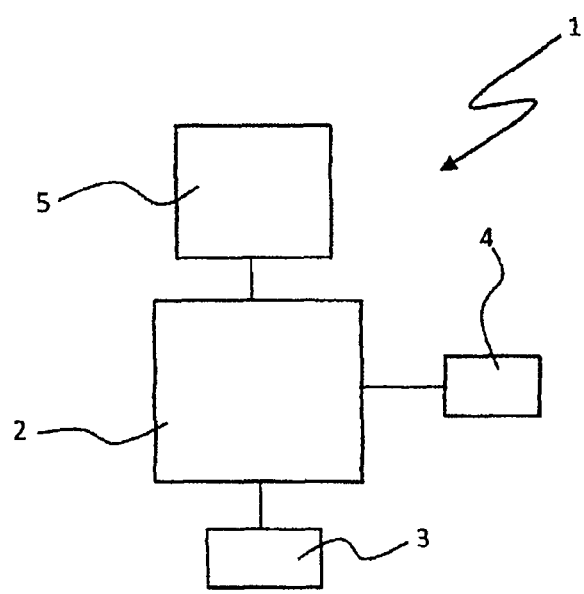
FIG. 1 is a diagram of an embodiment of a regenerative braking system of a motor vehicle.

The regenerative braking system represented in FIG. 1 is intended for a motor vehicle. It mainly comprises a computer 2, a control device 3, a means 4 of determining the speed of the vehicle (longitudinal speed), an energy regeneration braking device 5 and, if necessary, a means of detecting an action on a control member of a dissipative braking device. The means of detecting an action on a control member of a dissipative braking device may, for example, comprise a contact detector on the control member of the dissipative braking device. Alternatively, the detection device may comprise a force sensor sensing the force applied to the control member of the dissipative braking device, an action being considered to be exerted on the member when the force value supplied by the sensor exceeds a force threshold. Alternatively again, the detection means may comprise a position sensor sensing the position of the control member of the dissipative braking device, an action being considered to be exerted on the member when the position value supplied by the sensor exceeds a position threshold. The detection means generates an action signal on the dissipative braking control member which is transmitted to the computer, the signal comprising information indicating presence or absence of action on the dissipative braking control member.

The means 4 of determining the speed of the vehicle may, for example, comprise a speed sensor or a means of estimating this speed. The determination means generates a vehicle speed signal which is transmitted to the computer.

The control device 3 controls the regenerative braking device 5 via the computer. It generates a signal, a signal to activate or deactivate the regenerative braking device for example, which is transmitted to the computer. The control device may notably comprise a vehicle acceleration control member such as an accelerator pedal. In this case, the device may transmit a braking device activation signal when the driver causes the accelerator pedal to be raised and/or when the driver removes his/her foot from the accelerator pedal. Conversely, the device may transmit a braking device deactivation signal when the driver causes the accelerator pedal to be depressed and/or when the driver replaces his/her foot on the accelerator pedal.

On the basis of the signals transmitted to the computer 2, the latter generates, by virtue of the hardware and/or software means contained in the computer, a driver signal for the regenerative braking device. This driver signal comprises an intensity setpoint for the braking action to be implemented by the regenerative braking device. Thus, the computer comprises hardware and/or software means for implementing the regenerative braking method according to the invention and, therefore, hardware and/or software means for implementing the method of operation of the regenerative braking system according to the invention. The computer comprises computation means for calculating a braking action intensity setpoint value to be applied by the regenerative braking device according to the motor vehicle speed value when the regenerative braking device is activated and, where appropriate, a means of modifying the braking action intensity setpoint value to be applied by the regenerative braking device when an action is detected on the control member of the dissipative braking device.

A regenerative braking system suitable for implementing the regenerative braking method according to the invention comprises hardware and/or software means for implementing the essential steps of the regenerative braking method. To this end, the regenerative braking system, for example a computer of the regenerative braking system, comprises hardware and/or software means for calculating a time ramp of the trend of the setpoint value of the intensity of the regenerative braking action to be exerted by the regenerative braking device just after an activation of this regenerative braking device and/or just after a modification of the setpoint value following the detection of the presence of an action on the dissipative braking control member or the detection of the absence of an action on the dissipative braking control member. The hardware and/or software means may comprise computer programs.

These means may comprise computer programs.

Preferably, the regenerative braking device comprises an electric machine operating as an electric generator to charge batteries. However, the device may comprise any other technology that can be used to convert the kinetic energy of the vehicle into a second energy that can be stored and reused subsequently, for example to start and/or accelerate the vehicle.

Figure 2:
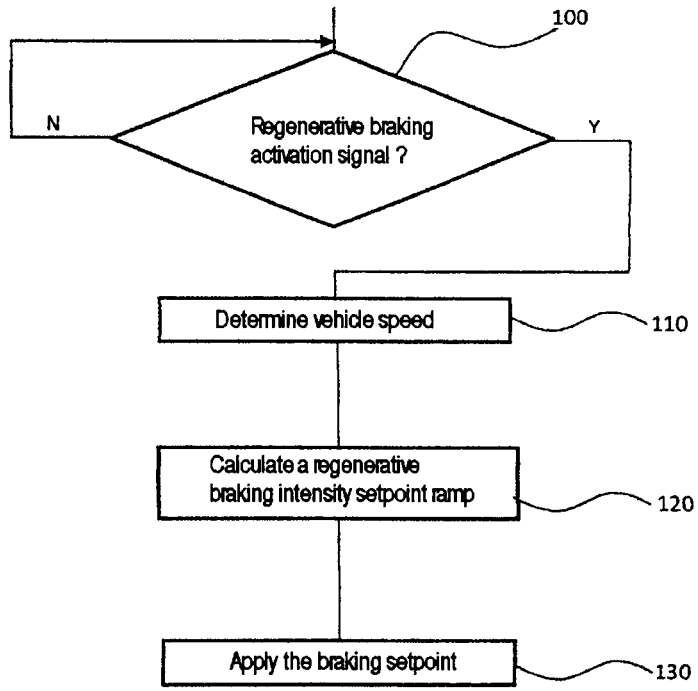
FIG. 2 is a diagram of a first mode of execution of the regenerative braking method according to the invention.

A first mode of execution of the braking method or a mode of execution of the method of operation of the regenerative braking system is described hereinbelow with reference to FIG. 2.

In a first test step 100, a test is carried out for the presence of a regenerative braking device activation signal. In the absence of an activation signal, the method loops on the step 100. If an activation signal is present, the method goes on to a step 110.

In the step 110, the speed of the motor vehicle is determined. For example, for this, the signal transmitted by the speed determination means is analyzed.

In a step 120, a ramp of setpoint values of braking action intensity to be applied by the regenerative braking device just after an instant of activation of the regenerative braking device is calculated. The progressiveness of the trend ramp of the setpoint values depends on the speed of the vehicle. This progressiveness is such that the trend of the ramp is more abrupt for a first speed of the vehicle than for a second value of the vehicle greater than the first speed. Examples of calculations of setpoint value ramps are, for example, performed as described hereinbelow with reference to FIG. 3. From these ramps, a drive signal for the device of the regenerative braking device is generated.

In a step 130, the driver signal is transmitted to the regenerative braking device which then operates in accordance with the setpoint values contained in the driver's signal. Thus, in this mode of operation, the intensity of the braking action is equal (or substantially equal) to the setpoint value.

Figure 4:
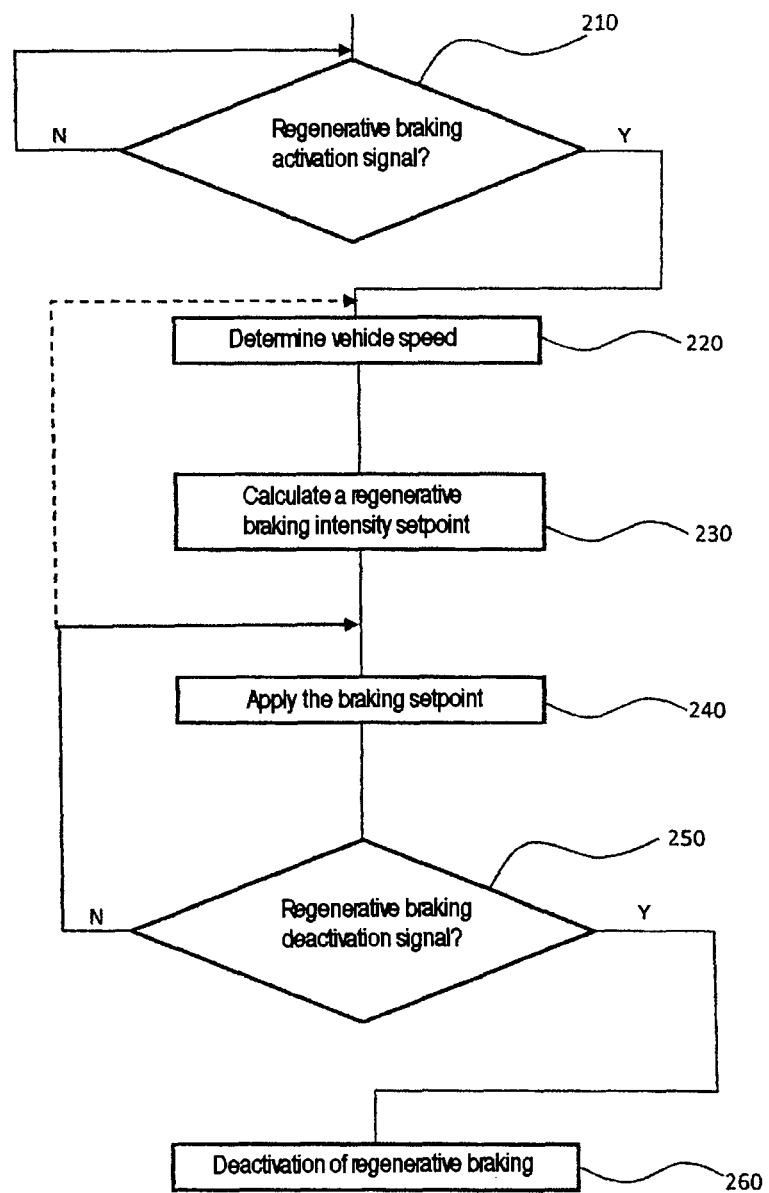
FIG. 4 is a diagram of a second mode of execution of the regenerative braking method according to the invention.

A second mode of execution of the braking method or a second mode of execution of the method of operation of the regenerative braking system is described hereinbelow with reference to FIG. 4.

In a first test step 210, a test is carried out for the presence of a regenerative braking device activation signal. In the absence of an activation signal, the method loops on the step 210. If an activation signal is present, the method goes on to a step 220.

In the step 220, the speed of the motor vehicle is determined. For example, for this, the signal transmitted by the speed determination means is analyzed.

In a step 230, a braking action intensity setpoint value to be applied by the regenerative braking device is calculated. This setpoint value is, for example, an equivalent force value being exerted on the vehicle acting against its displacement. Any other braking torque or braking power value equivalent to this braking force value may be used as setpoint value to drive the operation of the regenerative braking device. The calculation of the setpoint value is, for example, performed as described below with reference to FIG. 5. Based on these setpoint values, a driver signal for the regenerative braking device is generated.

In a step 240, the driver signal is transmitted to the regenerative braking device which then operates in accordance with the setpoint values contained in the driver signal. Thus, in this mode of operation, the intensity of the braking action is equal (or substantially equal) to the setpoint value. As a consequence of such a mode of execution of the braking method, the intensity of the regenerative braking action of the motor vehicle depends on the speed of the motor vehicle and a modification of the speed of the vehicle leads, all other things being equal, to a modification of the regenerative braking intensity.

In a test step 250, a test is carried out for the presence of a regenerative braking device deactivation signal. In the absence of a deactivation signal, the method loops on the step 240 (or alternatively, in a variant execution on the step 220). If a deactivation signal is present, the method goes on to a step 260 in which the regenerative braking device is deactivated.

Figure 5:
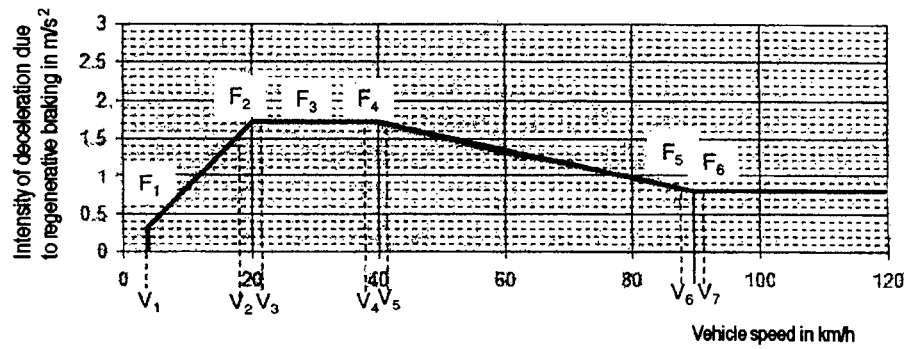
FIG. 5 is a graphic representation illustrating the principle of the second mode of execution of the regenerative braking method according to the invention.

In an exemplary embodiment particularly suited to electric vehicles, the calculation of the setpoint value of the braking intensity of the regenerative braking device is applied as described hereinbelow with reference to FIG. 5. In a first approximation, assuming that the regenerative braking is the only braking (or the predominant braking) applied to a vehicle, a value F of intensity of the braking action has a corresponding deceleration A of the vehicle of mass M according to the formula: $F = M \times A$.

In a first range of speeds of the vehicle between a first threshold value v1 and a second threshold value v2, the setpoint value of the intensity F of the regenerative braking action increases with the speed of the vehicle between a first value F1 and a second value F2. Preferably, the setpoint value of the intensity F of the regenerative braking action changes continually between F1 and F2, for example linearly.

In a second range of speeds of the vehicle between a third threshold value v3 and a fourth threshold value v4, the setpoint value of the intensity F of the regenerative braking action remains substantially constant about a third value F3. Preferably, the setpoint value of the intensity F of the regenerative braking action changes continually within this range, for example linearly.

In a third range of speeds of the vehicle between a fifth threshold value v5 and a sixth threshold value v6, the setpoint value of the intensity F of the regenerative braking action decreases with the speed of the vehicle between a fourth value F4 and a fifth value F5. Preferably, the setpoint value of the intensity F of the regenerative braking action changes continually between F4 and F5, for example linearly.

In a fourth range of speeds of the vehicle extending beyond a seventh threshold value v7, the setpoint value of the intensity F of the regenerative braking action remains substantially constant about a sixth value F6.

Preferably, the setpoint value of the intensity F of the regenerative braking action changes continually within this range, for example linearly.

Preferably, F2=F3 and/or F3=F4 and/or F5=F6 and/or v2=v3 and/or v4=v5 and/or v6=v7.

The speed threshold v2 may be between 15 and 25 km/h and is preferably equal to 20 km/h.

The speed threshold v4 may be between 35 and 45 km/h and is preferably equal to 40 km/h.

The speed threshold v6 may be between 80 and 100 km/h and is preferably equal to 90 km/h.

The intensity F3 of the regenerative braking action may correspond to a deceleration of the vehicle of between 1.5 and 2 m/s$^2$ and preferably corresponds to a deceleration of 1.7 m/s$^2$.

The intensity F6 of the regenerative braking action may correspond to a deceleration of the vehicle of between 0.5 and 1 m/s$^2$ and preferably corresponds to a deceleration of 0.8 m/s$^2$.

Preferably, the speed threshold v1 is 5 km/h and/or the regenerative braking device is deactivated when the speed of the vehicle is less than v1.

This mode of execution of the regenerative braking method presents advantages over vehicles that have a regenerative braking level that is constant according to their speed. In practice, the constant nature of the intensity of the regenerative braking action generates discomfort at high speed and leads to high energy consumption during reacceleration phases. Furthermore, at low speed (town use), the constant nature of the intensity of the regenerative braking does not optimize the quantity of energy regenerated. Conversely, by virtue of this mode of execution, the regenerative braking is significant at low speed (for example, in urban traffic) in order to regenerate a maximum of energy. At high speed, the regenerative braking becomes weaker (for example in open highway traffic) and thus makes it possible not to lose too much speed and not to have to reaccelerate too strongly over a range of operation of the engine over which the efficiency of the engine is low.

In this second mode of execution, the regenerative braking action produced by the regenerative braking device is applied progressively, the speed of application of the braking action depending on the speed of the motor vehicle.

Figure 6:
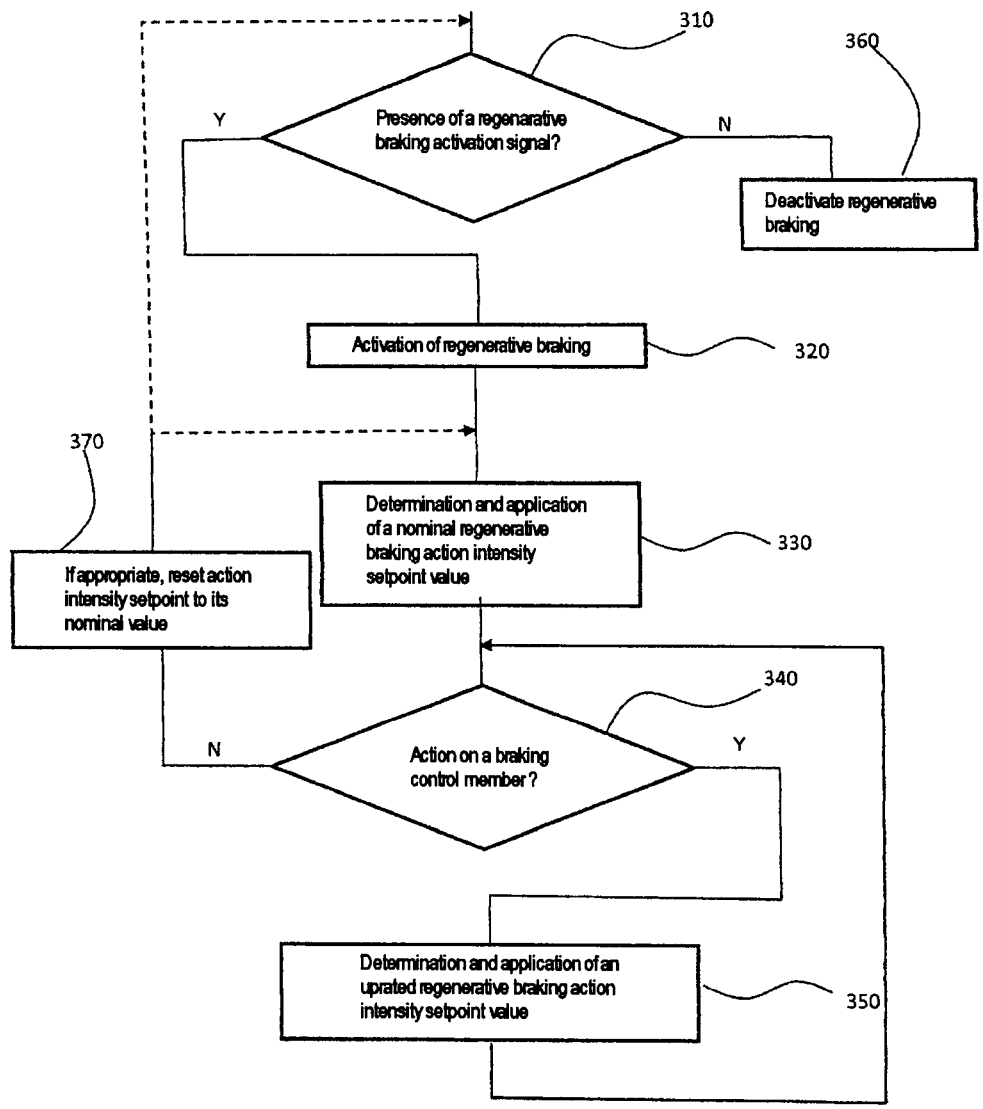
FIG. 6 is a diagram of a third mode of execution of the regenerative braking method according to the invention.

A third mode of execution of the braking method or a third mode of execution of the method of operation of the regenerative braking system is described hereinbelow with reference to FIG. 6.

In a first test step 310, a test is carried out for the presence of a regenerative braking device activation signal. In the absence of an activation signal, the regenerative braking device is deactivated in a step 360. If an activation signal is present, the method goes on to a step 320.

In the step 320, the regenerative braking device is activated.

For this, in a step 330, a braking action intensity setpoint value to be applied by the regenerative braking device is calculated. This value is called nominal because it is calculated assuming that there is no action on the part of the driver on the dissipative braking device control member. This setpoint value is, for example, an equivalent force value exerted on the vehicle countering its displacement. Any other braking torque or braking power value equivalent to this braking force value may be used as setpoint value to drive the operation of the regenerative braking device. The calculation of the setpoint value is, for example, performed as described hereinbelow with reference to FIG. 7. From these setpoint values, a driver signal for the regenerative braking device is generated, which is transmitted to the regenerative braking device which then operates in accordance with the setpoint values contained in the driver signal. Thus, in this mode of operation, the intensity of the braking action is equal (or substantially equal) to the setpoint value.

In a test step 340, a test is carried out for the presence of an action on the dissipative braking device control member such as a brake pedal. In the absence of any action, the method loops on the step 310, resetting, in a step 370, if necessary (if the setpoint value has been modified in a step 350), the setpoint value to its nominal value. Alternatively, the method loops on the step 330 via the step 370. In case of action on the dissipative braking device control member, the method goes on to the step 350 in which the setpoint value of the intensity of the action of the regenerative braking device is modified. This modification is an uprating of the setpoint value from what it was, all other things being equal, before an action on the dissipative braking device control member was detected, that is to say, an uprating of the nominal setpoint value. An uprated setpoint value is then obtained.

Preferably, the uprating is an addition of a constant value to the nominal setpoint value, this uprating possibly corresponding to a deceleration of the vehicle of between 0.2 m/s$^2$ and 0.8 m/s$^2$ and preferably equal to 0.5 m/s$^2$.

The nominal setpoint value is not necessarily constant. It may notably depend on various parameters, notably various vehicle status parameters and in particular the speed of the vehicle as represented in FIG. 7.

In an exemplary embodiment particularly suited to electric vehicles, the calculation of the setpoint value of the braking intensity of the regenerative braking device is implemented as described hereinbelow with reference to FIG. 7. In a first approximation, assuming that the regenerative braking is the only braking (or the predominant braking) applied to a vehicle, a value F of intensity of the braking action has a corresponding deceleration A of the vehicle of mass M according to the formula: F=M×A.

Figure 7:
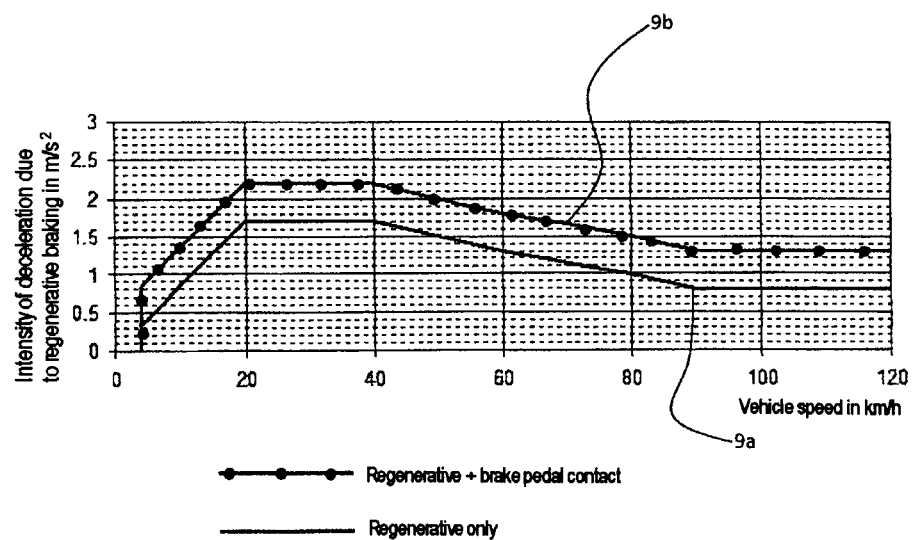
FIG. 7 is a graphic representation illustrating the principle of the third mode of execution of the regenerative braking method according to the invention.

In this FIG. 7, a first curve 9a represents the nominal regenerative braking action intensity setpoint value according to the speed of the vehicle, this curve corresponding to a situation in which the driver does not exert any action on the dissipative braking device activation control member and a second curve 9b represents the uprated regenerative braking action intensity setpoint value according to the speed of the vehicle, this curve corresponding to a situation in which the driver exerts an action on the dissipative braking device activation control member.

This mode of execution notably increases the energy regenerated during braking.

Figure 3:
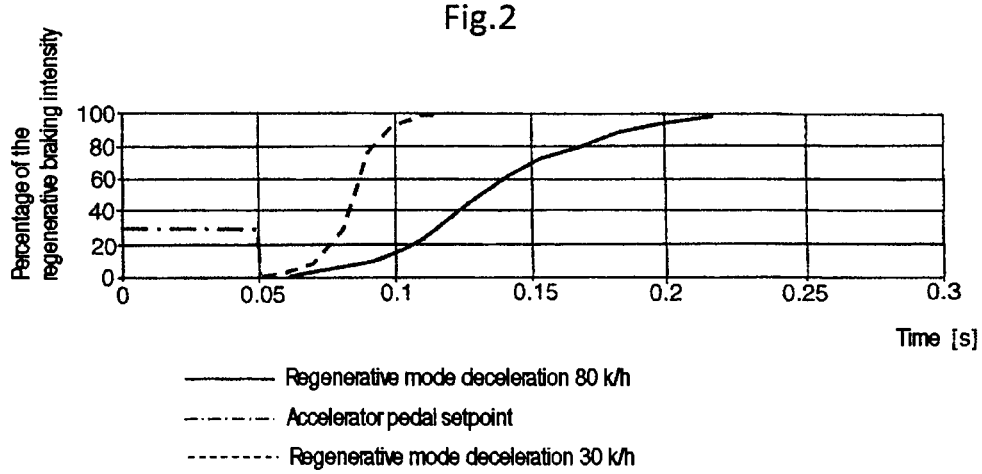
FIG. 3 is a graphic representation illustrating the principle of the regenerative braking method according to the invention.

In the three modes of execution of the regenerative braking method, particularly suited to electric vehicles, the calculation of the ramps of setpoint values of the braking intensity of the regenerative braking device is implemented as described hereinbelow with reference to FIG. 3. This figure describes the trend of the value of the setpoint of the intensity of the regenerative braking action after an activation of the regenerative braking device at the time t=0.05 s. A first dotted line curve reproduces a ramp of regenerative braking device action intensity setpoint values for a vehicle speed of 30 km/h for example. The setpoint reaches 100% of its value (for example, the braking force intensity value corresponding to a deceleration of 1.7 m/s) at t=0.12 s (or 0.07 s after activation of the brake device) for example.

A second, solid line curve reproduces a ramp of regenerative braking device action intensity setpoint values for a vehicle speed of 80 km/h for example. The setpoint reaches 100% of its value (for example, the braking force intensity value corresponding to a deceleration of 1 m/s) at t=0.23 s (or 0.18 s after activation of the brake device) for example.

Thus, the regenerative braking action is applied progressively, the speed of application of the braking action depending on the speed of the motor vehicle.

These modes of execution of the braking method offer the following advantages:
- they guarantee a good level of comfort at high speed because there are no jerks when activating the regenerative braking, and
- they make it possible to increase the speed of reaction of the braking at low speed (for example, in dense traffic).

The ramps are preferably continuous. They may be linear. They may also have an inflection point and/or have continuous drift.

Preferably, a map is used to define, for all the speeds of the vehicle, parameters concerning the intensity of the braking action, the start of activation of the braking, time to achieve this braking intensity and action stabilization time.

In this application, the expression "at least substantially constant" should be understood to mean "constant or substantially constant".

The invention claimed is:

1. A regenerative braking method for a motor vehicle, comprising:
   testing, via a computer, for a regenerative braking action signal generated by a control device;
   when the regenerative braking action signal is present, determining a speed of the motor vehicle and calculating a regenerative braking intensity setpoint as a function of the speed of the motor vehicle when a brake pedal of the motor vehicle is not contacted;
   progressively applying a regenerative braking action, via a regenerative braking device of the motor vehicle, at a predetermined intensity according to the regenerative braking intensity setpoint; and
   adding a value to the regenerative braking intensity setpoint such that the regenerative braking action applied by the regenerative braking device is increased when the brake pedal is contacted.

2. The braking method as claimed in claim 1, wherein the intensity of the braking action increases with the speed of the motor vehicle over a first range of speeds extending from a first speed threshold to a second speed threshold.

3. The braking method as claimed in claim 2, wherein the intensity of the braking action is at least substantially constant over a second range of speeds extending from a third speed threshold to a fourth speed threshold.

4. The braking action as claimed in claim 3, wherein the intensity of the braking action decreases with the speed of the motor vehicle over a third range of speeds extending from a fifth speed threshold to a sixth speed threshold.

5. The braking method as claimed in claim 4, wherein the intensity of the braking action is at least substantially constant over a fourth range of speeds extending beyond a seventh speed threshold.

6. The braking method as claimed in claim 1, further comprising:
   reducing the intensity of the regenerative braking action of the motor vehicle when action is no longer exerted on the brake pedal of the motor vehicle.

7. The braking method as claimed in claim 6, wherein the intensity of the braking action is reduced by a first constant value.

8. The braking method as claimed in claim 1, wherein the value added to the regenerative braking intensity setpoint when the regenerative braking device is activated is constant for a range of the speed of the motor vehicle.

9. A non-transitory computer readable data medium comprising computer executable instruction that, when executed by a computer, causes the computer to execute:
   testing, via a computer, for a regenerative braking action signal generated by a control device;
   when the regenerative braking action signal is present, determining a speed of a motor vehicle and calculating a regenerative braking intensity setpoint as a function of the speed of the motor vehicle when a brake pedal of the motor vehicle is not contacted;
   progressively applying a regenerative braking action, via a regenerative braking device of the motor vehicle, to the motor vehicle at a predetermined intensity according to the regenerative braking intensity setpoint; and
   adding a value to the regenerative braking intensity setpoint such that the regenerative braking action applied by the regenerative braking device is increased when the brake pedal is contacted.

10. The non-transitory computer readable data medium as claimed in claim 9, wherein the value added to the regenerative braking intensity setpoint when the regenerative braking device is activated is constant for a range of the speed of the motor vehicle.

* * * * *